United States Patent
Shin et al.

(10) Patent No.: US 7,636,807 B2
(45) Date of Patent: Dec. 22, 2009

(54) STORAGE APPARATUS USING NONVOLATILE MEMORY AS CACHE AND MAPPING INFORMATION RECOVERING METHOD FOR THE STORAGE APPARATUS

(75) Inventors: Dong-kun Shin, Seoul (KR);
Jang-hwan Kim, Suwon-si (KR);
Jeong-eun Kim, Gwangmyeong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 501 days.

(21) Appl. No.: 11/656,536

(22) Filed: Jan. 23, 2007

(65) Prior Publication Data
US 2007/0204100 A1 Aug. 30, 2007

(30) Foreign Application Priority Data
Feb. 24, 2006 (KR) .................. 10-2006-0018286

(51) Int. Cl.
*G06F 12/00* (2006.01)
(52) U.S. Cl. ................ 711/3; 711/103; 711/112; 711/202
(58) Field of Classification Search .................. None
See application file for complete search history.

(56) References Cited

U.S. PATENT DOCUMENTS

| | | | |
|---|---|---|---|
| 5,937,433 A | 8/1999 | Lee et al. | |
| 6,105,103 A * | 8/2000 | Courtright et al. | ........ 711/1 |
| 2003/0163594 A1 | 8/2003 | Aasheim et al. | |
| 2003/0163633 A1 | 8/2003 | Aasheim et al. | |
| 2004/0085849 A1 * | 5/2004 | Myoung et al. | ........ 365/232 |
| 2004/0186946 A1 | 9/2004 | Lee | |
| 2009/0070637 A1 * | 3/2009 | Van Acht et al. | ........ 714/52 |

FOREIGN PATENT DOCUMENTS

| | | |
|---|---|---|
| JP | 05-225062 A | 9/1993 |
| JP | 06-028261 A | 2/1994 |
| KR | 10-1998-063018 A | 10/1998 |
| KR | 2003-0040817 A | 5/2003 |
| WO | 9844420 A | 10/1998 |

* cited by examiner

*Primary Examiner*—Brian R Peugh
(74) *Attorney, Agent, or Firm*—Sughrue Mion, PLLC

(57) ABSTRACT

A storage apparatus using a nonvolatile memory as a cache and a mapping information recovering method for the storage apparatus are provided. The storage apparatus includes a mapping information storage module which stores in the nonvolatile memory mapping information of the nonvolatile memory and a first physical block address allocated when the mapping information is stored; a scan module which scans the first physical block address through a second physical block address allocated currently; and a mapping information recovery module which recovers the mapping information between the first physical block address and the second physical block address based on a result of the scan by the scan module.

21 Claims, 7 Drawing Sheets

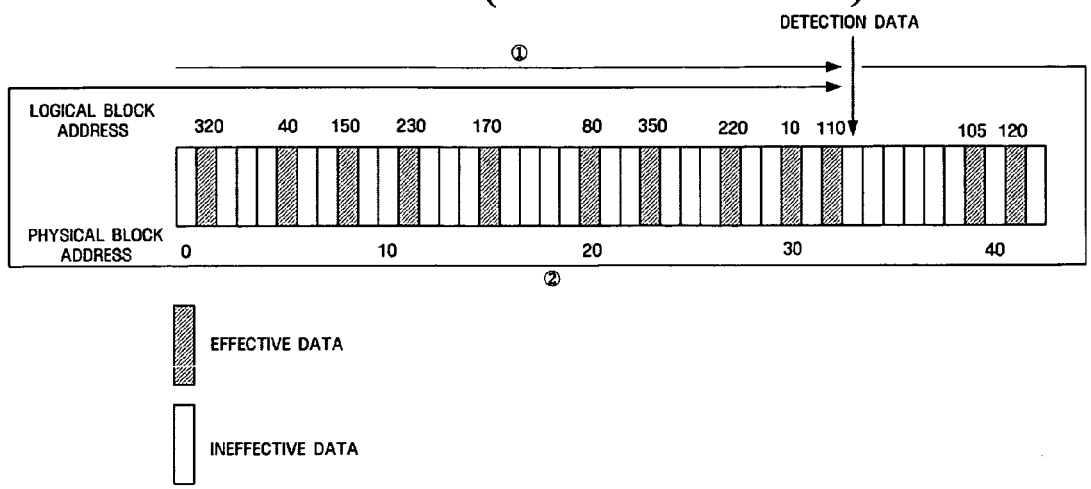

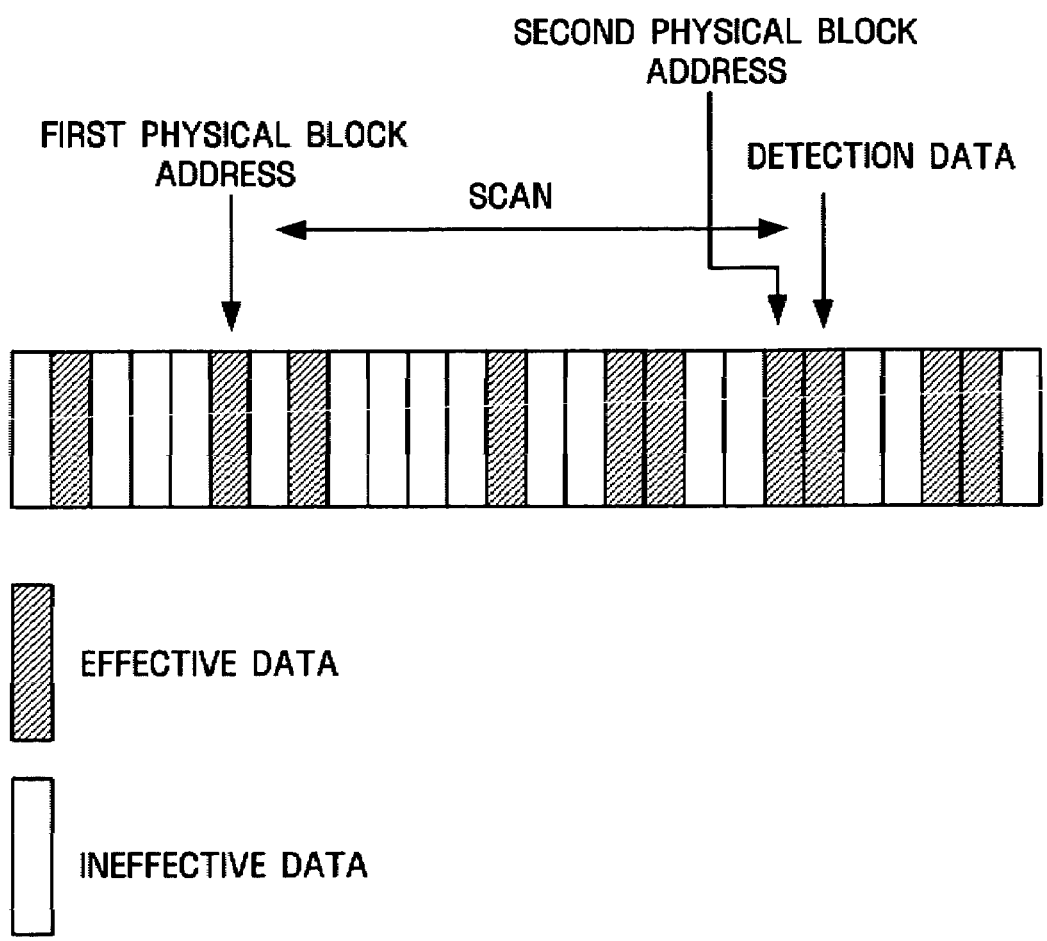

STORAGE APPARATUS USING NONVOLATILE MEMORY AS CACHE AND MAPPING INFORMATION RECOVERING METHOD FOR THE STORAGE APPARATUS

CROSS-REFERENCE TO RELATED APPLICATION

This application claims priority from Korean Patent Application No. 10-2006-0018286 filed on Feb. 24, 2006 in the Korean Intellectual Property Office, the disclosure of which is incorporated herein by reference in its entirety.

BACKGROUND OF THE INVENTION

1. Field of the Invention

Apparatuses and methods consistent with the present invention relate to using a nonvolatile memory as a cache in a storage apparatus and recovering mapping information, and more particularly, to a storage apparatus which uses a nonvolatile memory as a cache, and is capable of safely recovering mapping information, and a mapping information recovering method for the storage apparatus.

2. Description of the Related Art

Generally, nonvolatile memories are widely used in embedded systems, such as electric home appliances, communication devices and set-top boxes, as storage media for storing and processing data.

Flash memories, which are one of the most widely used nonvolatile memories, are nonvolatile memory devices that can electrically erase or rewrite data. Flash memories consume less power than storage media based on magnetic disk memories and have access time as fast as hard disks. In addition, since flash memories are small, they are suitable for handheld devices.

Nonvolatile memories have recently been used as caches of storage media such as hard disk drives, thereby reducing power consumption of the hard disk drives and the time taken to boot systems using the nonvolatile memories as the caches. If a nonvolatile memory is used as a cache, when a host desires to store data in a hard disk drive, the data is first stored in the nonvolatile memory. Then, when there is no more storage space left in the nonvolatile memory, the data stored in the nonvolatile memory is moved to the hard disk drive. Since the power supply to the hard disk drive can be cut off while the data is read or written from/to the nonvolatile memory, power consumption can be reduced.

Storage apparatuses using nonvolatile memories as caches require mapping information for converting logical block addresses into physical block addresses so that hosts can access the physical block addresses of nonvolatile memories through the logical block addresses.

Mapping information is generally stored in volatile memories when hard disk drives are operated, and stored in nonvolatile memories when the hard disk drives are tuned off. Then, when the hard disk drives are turned on again, the mapping information stored in the nonvolatile memories is reloaded into the volatile memories so that hosts can access data based on the mapping information.

Characteristically, storage apparatuses using nonvolatile memories as caches may unexpectedly be turned off. In this case, since mapping information stored in volatile memories cannot be stored in the nonvolatile memories, a process of recovering the mapping information is required.

Related art methods of recovering mapping information include a method of scanning an entire nonvolatile memory and a method of periodically storing mapping information in a nonvolatile memory.

According the method of scanning an entire nonvolatile memory, the entire nonvolatile memory is scanned to find detection data stored in a next physical block address of a last allocated physical block address as illustrated in FIG. 1. Here, data is classified into effective data and ineffective data, and mapping information is recovered as illustrated in FIG. 2.

In this method, the entire nonvolatile memory may be scanned twice in the worst case, that is, once for finding the detection data and once for recovering mapping information. In this case, since the time required to scan the nonvolatile memory is increased, it takes a longer time to boot a system that uses the nonvolatile memory.

According to the method of periodically storing mapping information in a nonvolatile memory, the mapping information is periodically stored in the nonvolatile memory to avoid scanning the entire nonvolatile memory as described above.

Therefore, when a storage apparatus using the nonvolatile memory as a cache is booted next time, a host can access data stored in the nonvolatile memory based on the mapping information that is stored in the nonvolatile memory.

However, in this method, the mapping information is too frequently and unnecessarily stored in the nonvolatile memory. In other words, the mapping information is stored in the nonvolatile memory not only when the storage apparatus using the nonvolatile memory as a cache is turned off, but also when the storage apparatus is operated, which becomes a major cause of performance deterioration of the storage apparatus.

Korean Laid-Open Patent Publication No. 1998-0063018 discloses a cache memory device which can reduce initial line fetch time by allowing a user to deliberately fill the cache memory device with data when a computer is booted or reset. Generally, it requires a lot of time to bring data from a cache memory device to a main memory device through a line fetch operation when a computer is booted or reset. Furthermore, since a start address for the line fetch operation is determined arbitrarily, the line fetch operation may have to be performed several times in the worst case. The above related art is designed to solve these problems. However, it fails to suggest a method of rapidly recovering mapping information in the event of an unexpected power failure and minimizing storage space required for recovering the mapping information.

SUMMARY OF THE INVENTION

The present invention provides a storage apparatus using a nonvolatile memory as a cache, the storage apparatus capable of minimizing mapping information stored in order to recover the mapping information in the event of an unexpected power failure and rapidly recovering the mapping information, and a mapping information recovering method for the storage apparatus.

According to an aspect of the present invention, there is provided a storage apparatus using a nonvolatile memory as a cache. The storage apparatus includes a mapping information storage module which stores in the nonvolatile memory mapping information of the nonvolatile memory and a first physical block address allocated when the mapping information is stored; a scan module which scans the first physical block address through a second physical block address allocated currently; and a mapping information recovery module which recovers the mapping information between the first physical block address and the second physical block address based on a result of the scan of the scan module.

According to another aspect of the present invention, there is provided a mapping information recovering method for a storage apparatus using a nonvolatile memory as a cache. The method includes storing in the nonvolatile memory mapping information of the nonvolatile memory and a first physical block address allocated when the mapping information is stored; scanning the first physical block address through a second physical block address allocated currently; and recovering the mapping information between the first physical block address and the second physical block address based on a result of the scanning.

According to another aspect of the present invention, there is provided a computer readable recording medium storing a computer program for performing the mapping information recovering method.

BRIEF DESCRIPTION OF THE DRAWINGS

The above and other aspects of the present invention will become more apparent by describing in detail exemplary embodiments thereof with reference to the attached drawings, in which:

FIG. 1 is a diagram for explaining a related art method of recovering mapping information by scanning an entire nonvolatile memory;

FIG. 2 illustrates mapping information recovered using the method of recovering mapping information of FIG. 1;

FIG. 9 is a diagram illustrating intervals at which mapping information is recovered according to an exemplary embodiment of the present invention.

DETAILED DESCRIPTION OF EXEMPLARY EMBODIMENTS OF THE INVENTION

Figure 3:
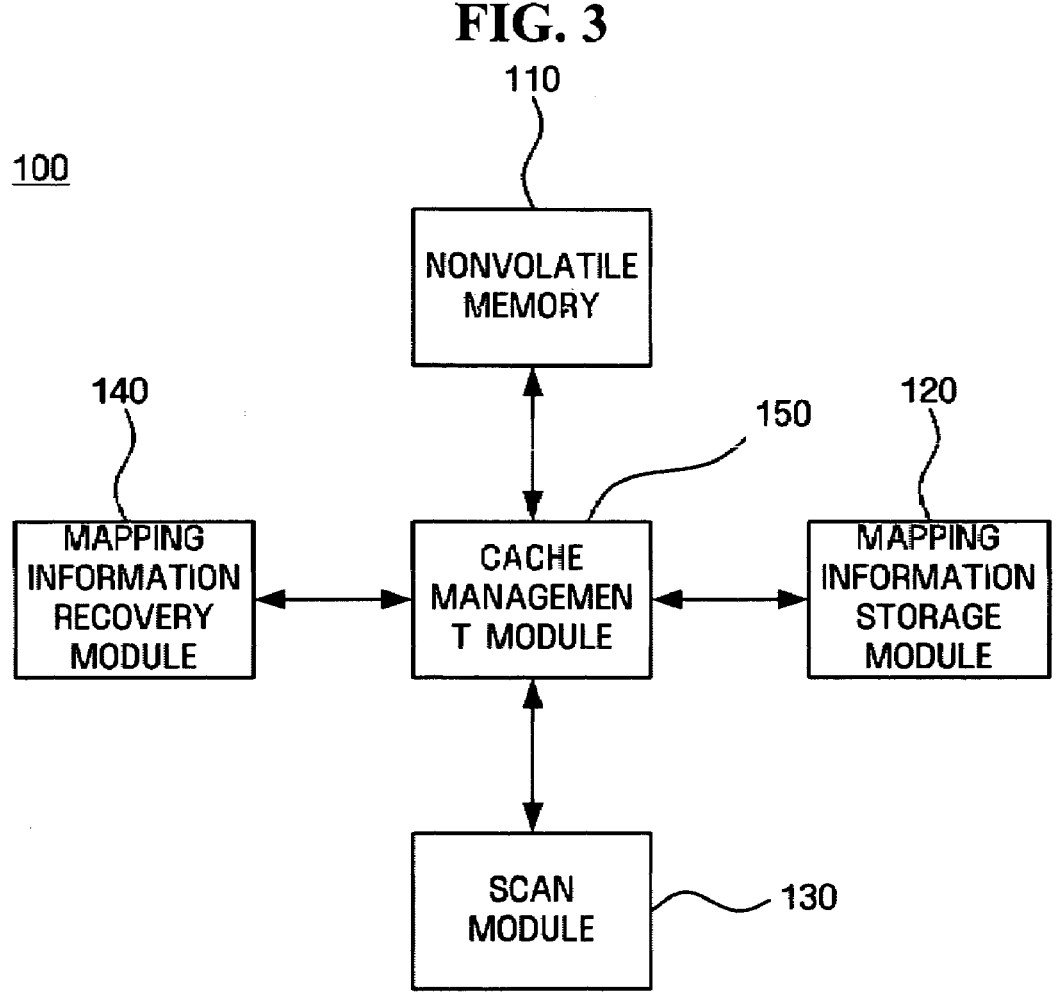
FIG. 3 is a block diagram of a storage apparatus using a nonvolatile memory as a cache according to an exemplary embodiment of the present invention.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. Like reference numerals in the drawings denote like elements, and thus their description will be omitted.

Hereinafter, a storage apparatus using a nonvolatile memory as a cache and a mapping information recovering method for the storage apparatus according to exemplary embodiments of the present invention will be described with reference to block diagrams or flowchart illustrations. It will be understood that each block of the flowchart illustrations, and combinations of blocks in the flowchart illustrations, can be implemented by computer program instructions. These computer program instructions can be provided to a processor of a general purpose computer, a special purpose computer, or other programmable data processing apparatus, such that the instructions, which are executed via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

FIG. 3 is a block diagram of a storage apparatus using a nonvolatile memory as a cache according to an exemplary embodiment of the present invention.

Referring to FIG. 3, the storage apparatus 100 includes the nonvolatile memory 110, a mapping information storage module 120, a scan module 130, a mapping information recovery module 140, and a cache management module 150.

Although not shown in FIG. 3, the storage apparatus 100 may include a mass storage medium such as a hard disk drive, and the nonvolatile memory 110 may be used as a cache of the mass storage medium. Therefore, when a host desires to write data to the mass storage medium, the data is first stored in the nonvolatile memory 110. Then, when there is no storage space left in the nonvolatile memory 110, the data stored in the nonvolatile memory 110 may be moved to the mass storage medium.

Figure 4:
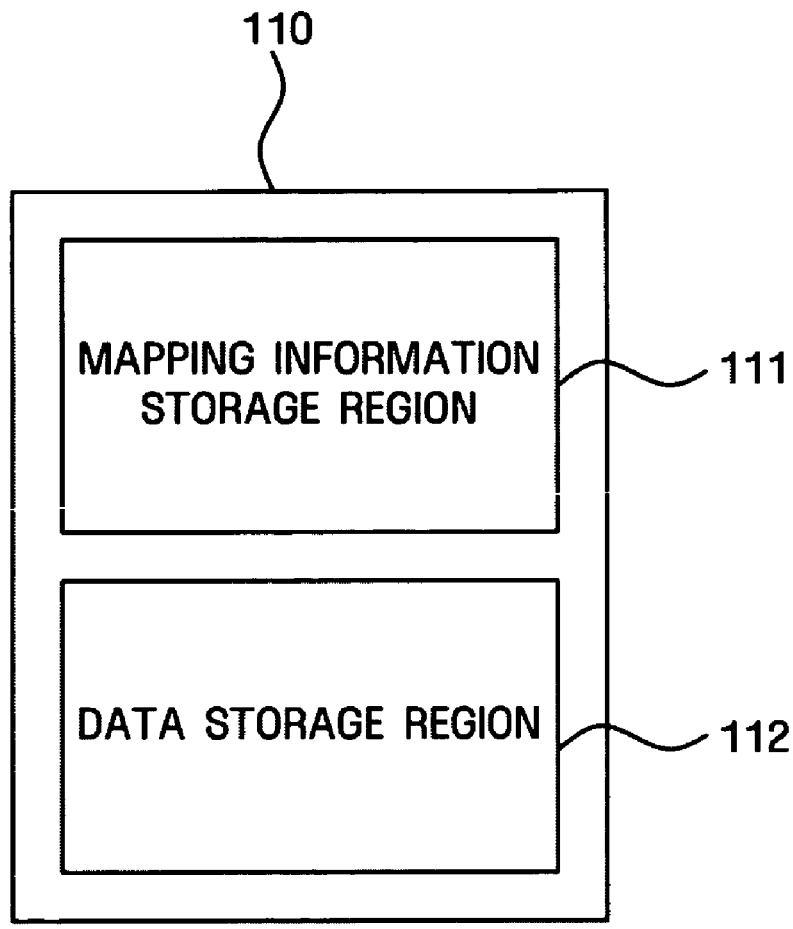
FIG. 4 is a block diagram of a nonvolatile memory according to an exemplary embodiment of the present invention.

As illustrated in FIG. 4, the nonvolatile memory 110 may include a mapping information storage region 111 and a data storage region 112. The mapping information storage region 111 stores mapping information for converting a logical block address into a physical block address so that the host can access data stored in the nonvolatile memory 110 through the logical block address. The data storage region 112 stores data.

Mapping information is stored in a volatile memory when the storage apparatus 100 is operated, and stored in the nonvolatile memory 110 when the storage apparatus 100 is tuned off. Then, when the storage apparatus 100 is turned on again, the mapping information stored in the nonvolatile memory 110 is stored again in the volatile memory, and data stored in the data storage region 112 of the nonvolatile memory 110 can be accessed based on the mapping information.

The mapping information storage module 120 stores mapping information in the mapping information storage region 111 of the nonvolatile memory 110 at predetermined intervals and may also store a physical block address (hereinafter referred to as a first physical block address) last allocated when the mapping information is stored. Characteristically, a system using the nonvolatile memory 110 may unexpectedly be turned off. In this case, a process of recovering mapping information is required. The mapping information recovery module 140, which will be described later, may recover mapping information using the mapping information and the first physical block address stored in the mapping information storage region 111 of the nonvolatile memory 110 by the mapping information storage module 120.

Figure 5:
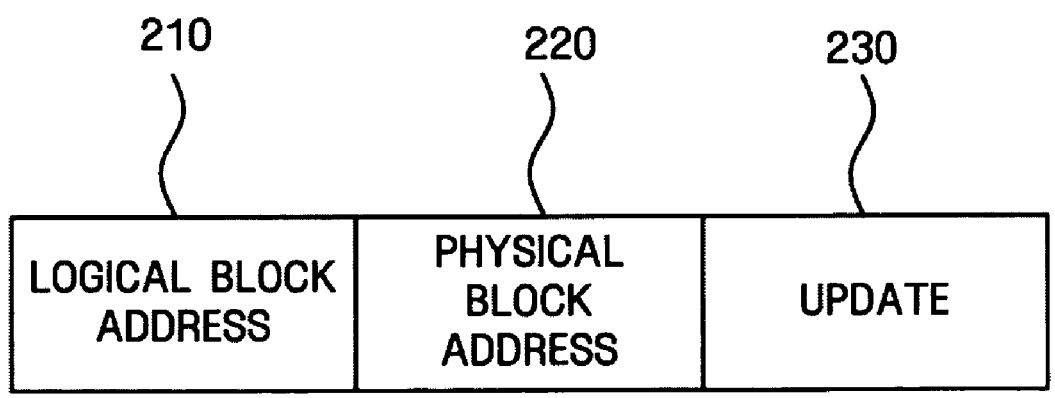
FIG. 5 illustrates the structure of mapping information according to an exemplary embodiment of the present invention.

FIG. 5 illustrates the structure of mapping information according to an exemplary embodiment of the present invention.

Referring to FIG. 5, the mapping information includes a logical block address field 210, a physical block address field 220, and an update field 230. The logical block address field 210 indicates a logical block address corresponding to a predetermined physical block address. The physical block address field 220 indicates a physical block address corresponding to a predetermined logical block address. The update field 230 indicates whether the physical block address corresponding to the predetermined. logical block address or the logical block address corresponding to the predetermined physical block address is updated.

The mapping information storage module 120 may initially store mapping information of the entire nonvolatile memory 110, but, thereafter, store only updated mapping information in the mapping information storage region 111 of the nonvolatile memory 110 based on the update field 230. Hereinafter, the mapping information of the entire nonvolatile memory 110 will be referred to as first mapping information, and the updated mapping information will be referred to as second mapping information. The mapping information described above with reference to FIG. 5 may be understood as the first mapping information.

The mapping information storage module 120 may store mapping information whenever a predetermined number of physical block addresses are allocated. When there is no more storage space left in the mapping information storage region 111, the mapping information storage module 120 may erase the mapping information storage region 111, store the first mapping information again, and then store the second mapping information in the mapping information storage region 111. The mapping information storage module 120 may repeat this process. In addition, after the second mapping information is stored, the update field 230 described above with reference to FIG. 5 is initialized.

If the mapping information storage module 120 stores mapping information whenever a predetermined number of physical block addresses are allocated, that is, if the mapping information storage module 12 stores mapping information too frequently, the amount of data becomes huge. Therefore, the mapping information storage module 120 may store mapping information for every physical block address to be scanned by the scan module 130, which will be described later, within the booting time of the storage apparatus 100. This is because the time taken for the scan module 130 to scan a physical block address can be understood as the time taken to recover mapping information.

When the power supply to the storage apparatus 100 is unexpectedly cut off, the scan module 130 scans the first physical block address stored in the mapping information storage region 111 of the nonvolatile memory 110 by the mapping information storage module 120 through a physical block address (hereinafter referred to as a second physical block address) allocated when the power failure occurred. And the scan module 130 scans logical block addresses corresponding to physical block addresses between the first physical block address and the second block address. When a physical block address is allocated, detection data is stored in a next physical block address so that the next physical block address can be detected based on the detection data. Therefore, the scan module 130 can determine the second physical block address allocated at the time of power failure of the storage apparatus 100.

In addition, when a physical block address is allocated, the scan module 130 stores a logical block address mapped to a predetermined region (for example, a spare region) of the allocated physical block address. Therefore, the scan module 130 can scan the logical block address mapped to the allocated physical block address.

The number of physical block addresses between the first physical block address and the second physical block address, which are scanned by the scan module 130, may be understood as the number of physical block addresses allocated after the first physical address, i.e., intervals at which the mapping information storage module 120 stores mapping information. For example, if the mapping information storage module 120 stores mapping information whenever N physical block addresses are allocated, a maximum number of physical block addresses scanned by the scan module 130 may be N. Here, if the power supply to the storage apparatus 100 is cut off before the N physical block addresses are allocated, the number of physical block addresses scanned by the scan module 130 may be less than N.

The mapping information recovery module 140 may recover mapping information between the first physical block address and the second physical block address, which was allocated at the time of the power failure of the storage apparatus 100, based on the scan result of the scan module 130.

Specifically, when power is supplied again to the storage apparatus 100 after the power failure, the mapping information recovery module 140 may recover mapping information using physical block addresses allocated between the first physical block address and the second physical block address and logical block addresses corresponding to the allocated physical block addresses based on the scan result of the scan module 130.

Since the mapping information recovery module 140 recovers mapping information only between the first physical block address and the second physical block address according to an exemplary embodiment of the present invention, the time taken to recover mapping information can be reduced as compared with a related art method of determining a physical block address last allocated, scanning entire physical block addresses based on the determined physical block address, and recovering mapping information.

The cache management module 150 stores data, which is stored in the volatile memory, in the data storage region 112 of the nonvolatile memory 110. In addition, when storing data in a physical block address of the nonvolatile memory 110, the cache management module 150 may also store a logical block address corresponding to the physical block address. This is to enable the scan module 130 described above to determine the logical block address as well when scanning the physical block address in order to recover mapping information.

Figure 6:
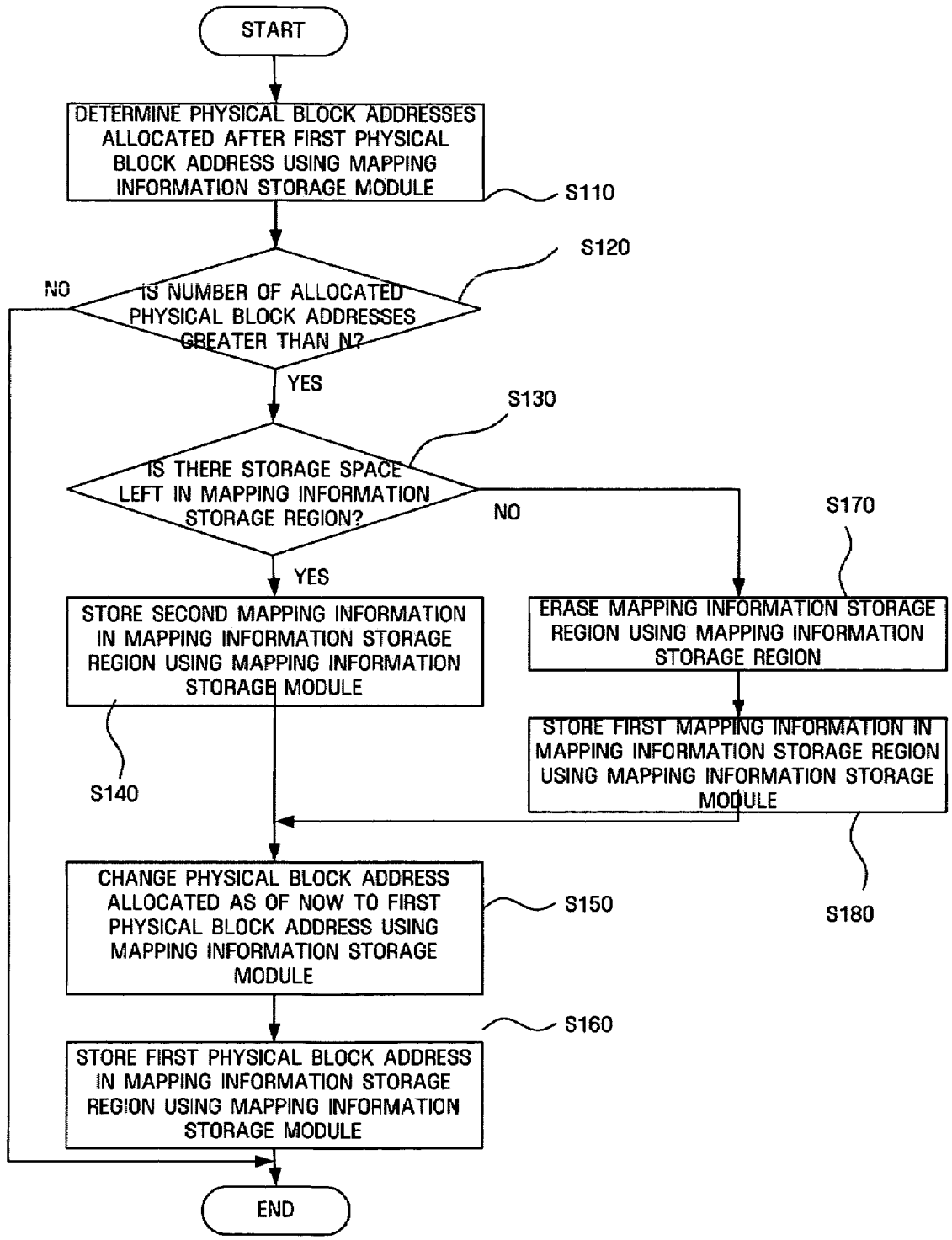
FIG. 6 is a flowchart illustrating a method of storing mapping information according to an exemplary embodiment of the present invention.

FIG. 6 is a flowchart illustrating a method of storing mapping information according to an exemplary embodiment of the present invention. The method will be described using a case where the mapping information storage module 120 stores the first mapping information, which is the mapping information of the entire nonvolatile memory 110, in the mapping information storage region 111 of the nonvolatile memory 110 as an example. In addition, a case where the first physical block address allocated when the first mapping information is stored, is stored together with the first mapping information will be described.

Referring to FIG. 6, the mapping information storage module 120 determines whether a predetermined number of physical block addresses have been allocated as of now after the first physical block address (operation S110). The method will be described based on the assumption that the number of allocated physical block addresses, which are determined by the mapping information storage module 120, are N. The N physical block addresses allocated after the first physical block address indicate the number of physical block addresses scanned by the scan module 130, and may be understood as the maximum number of physical block addresses which can be scanned within the booting time of the storage apparatus 100.

If it is determined that the number of physical block addresses allocated after the first physical block address is greater than N (operation S120), the mapping information storage module 120 determines whether there is storage space left in the mapping information storage region 111 of the nonvolatile memory 110 (operation S130).

If there is storage space left in the mapping information storage region 111, the mapping information storage module 120 stores the second mapping information, which is updated mapping information, in the mapping information storage region 111 based on the update field 230 of the first mapping information (operation S140).

Then, the mapping information storage module 120 changes a physical block address, which is last allocated when the second mapping information is stored, to the first physical block address (operation S150), and stores the first physical block address in the mapping information storage region 111 (operation S160).

If it is determined, in operation S130, that there is no storage space left in the mapping information storage region 111, the mapping information storage module 120 erases the mapping information storage region 111 (operation S170), and stores the first mapping information, which is the mapping information of the entire nonvolatile memory 110, in the mapping information storage region 111 (operation S180). In this case, the first mapping information stored in operation S180 may be understood as updated mapping information.

Next, as in operations S150 and S160, a physical block address last allocated as of now is changed to the first physical address, and the first physical block address is stored in the mapping information storage region 111.

Figure 7:
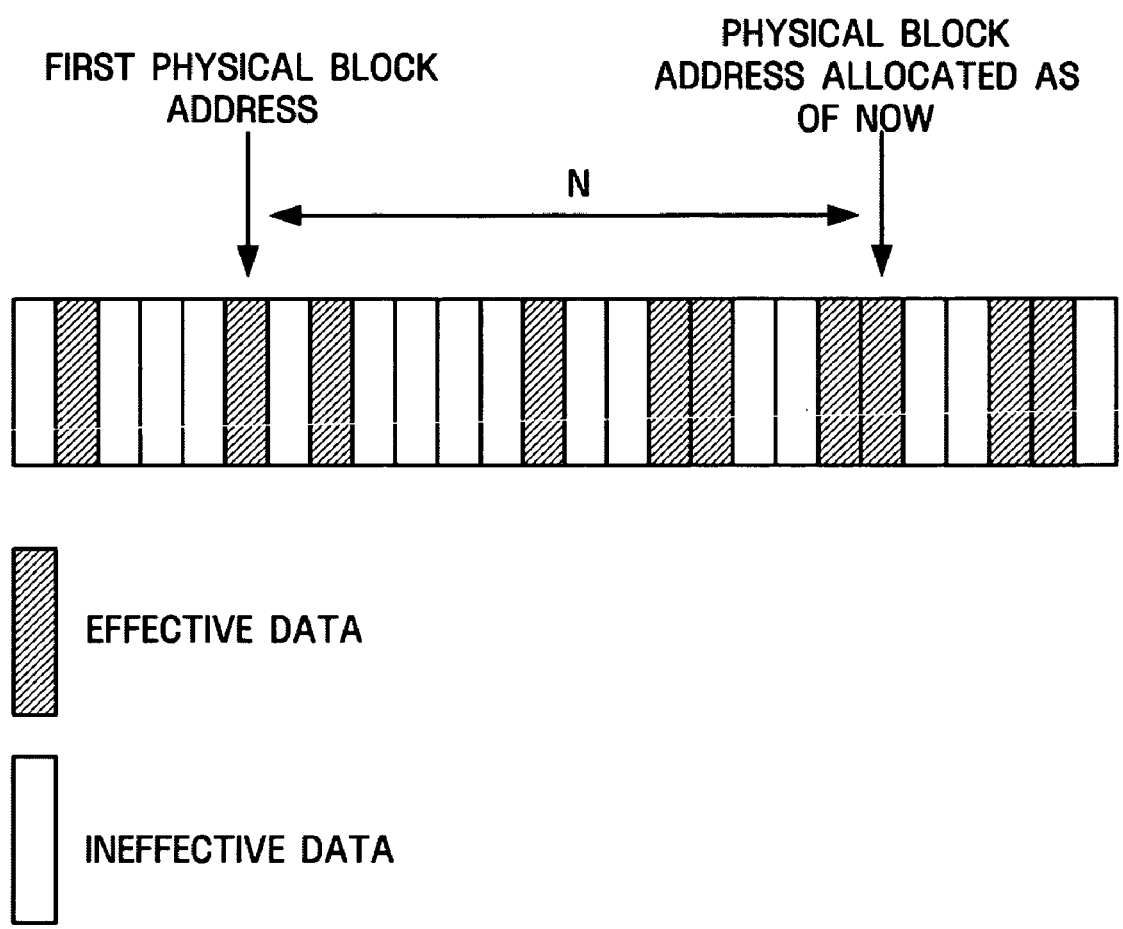
FIG. 7 is a diagram illustrating intervals at which mapping information is stored according to an exemplary embodiment of the present invention.

In other words, as illustrated in FIG. 7, when N physical block addresses are allocated after the first physical block address, which is last allocated when the first mapping information is stored, the mapping information storage module 120 may change a physical block address allocated as of now to the first physical block address, and store the updated second mapping information and the first physical block address in the mapping information storage region 111.

Figure 8:
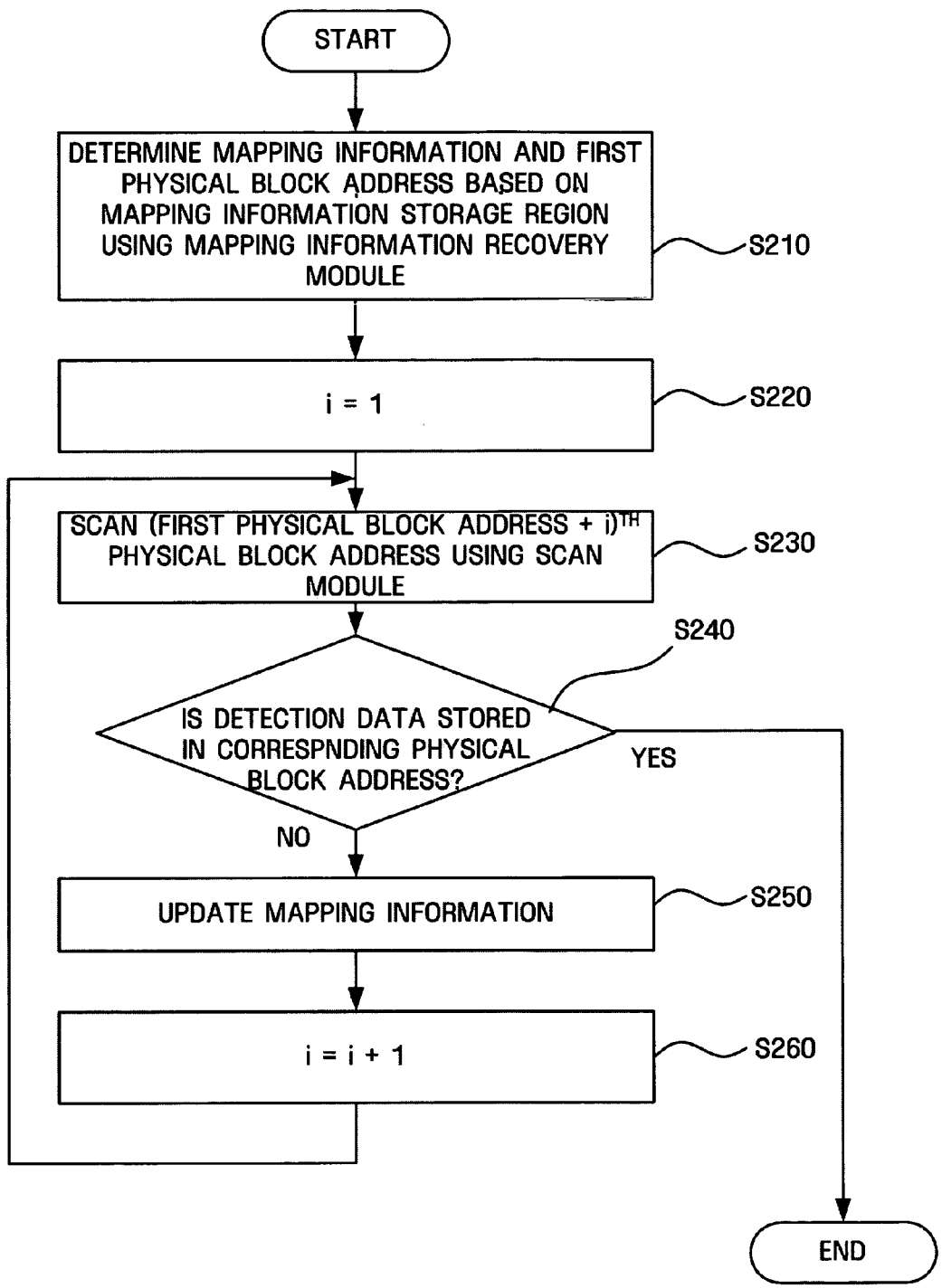
FIG. 8 is a flowchart illustrating a method of recovering mapping information according to an exemplary embodiment of the present invention.

FIG. 8 is a flowchart illustrating a method of recovering mapping information according to an exemplary embodiment of the present invention.

Referring to FIG. 8, the mapping information recovery module 140 determines mapping information and the first physical address based on the mapping information storage region 111 (operation S210). The mapping information determined here may include at least one of the first mapping information and the second mapping information.

The mapping information recovery module 140 sets a predetermined variable i and inputs 1 to the set variable i (operation S220). Then, the mapping information recovery module 140 scans a physical block address corresponding to the extracted first physical block address + the predetermined variable i using the scan module 130 (operation S230), and determines whether detection data is stored in the corresponding physical block address based on the scan result (operation S240).

If it is determined that the detection data is not stored in the corresponding physical block address, the mapping information recovery module 140 updates the mapping information (operation S250), and adds 1 to the predetermined variable i (operation S260).

Thereafter, the mapping information recovery module 140 may repeat the operations (operations S230 through S260) of updating the mapping information by increasing the predetermined variable i by 1, until the second physical block address having detection data is found.

In other words, as illustrated in FIG. 9, the mapping information recovery module 140 may update the mapping information based on the result of sequentially scanning physical block addresses from the first physical block address, which was extracted from the mapping information storage region 111 of the nonvolatile memory 110. In addition, the mapping information recovery module 140 may recover mapping information by determining a physical block address that stores detection data and updating mapping information between the first physical block address and the second physical block address, which is a previous physical block address of the determined physical block address. In this case, the mapping information recovery module 140 can recover mapping information using physical block addresses determined when the physical block addresses are scanned and logical block addresses corresponding to the physical block addresses.

As described above, according to a storage apparatus using a nonvolatile memory as a cache and a mapping information recovering method according to the exemplary embodiments of the present invention, the frequency with which mapping information is stored can be reduced, thereby preventing lifetime reduction and performance deterioration of the storage apparatus. Furthermore, when power is supplied again to the storage apparatus after a power failure, mapping information can be rapidly recovered.

The term 'module', as used herein, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A storage apparatus using a nonvolatile memory as a cache, the storage apparatus comprising:
a mapping information storage module which stores in the nonvolatile memory mapping information of the nonvolatile memory and a first physical block address allocated when the mapping information is stored;

a scan module which scans the first physical block address through a second physical block address allocated currently; and a mapping information recovery module which recovers the mapping information between the first physical block address and the second physical block address based on a result of the scan by the scan module.

2. The storage apparatus of claim 1, wherein the nonvolatile memory comprises a mapping information storage region storing the mapping information and the first physical block address.

3. The storage apparatus of claim 2, wherein the mapping information storage module stores the mapping information if a predetermined number of physical block addresses are allocated after the first physical block address.

4. The storage apparatus of claim 2, wherein the mapping information comprises:
first mapping information which is mapping information of the entire nonvolatile memory; and
second mapping information which is mapping information of an updated address.

5. The storage apparatus of claim 4, wherein the first mapping information comprises a logical block address field, a physical block address field, and an update field indicating whether an address is updated.

6. The storage apparatus of claim 5, wherein the mapping information storage module stores the first mapping information in the mapping information storage region, and additionally stores the second mapping information in the mapping information storage region based on a value of the update field.

7. The storage apparatus of claim 6, wherein the mapping information storage module erases the mapping information storage region and stores the first mapping information in the mapping information storage region, if there is no storage space left in the mapping information storage region.

8. The storage apparatus of claim 1, wherein the scan module determines the second physical block address based on detection data which is stored in a physical block address placed after an allocated physical block address, and scans the first physical block address through the determined second physical block address.

9. The storage apparatus of claim 8, wherein the mapping information recovery module recovers the mapping information based on the scanned physical block addresses and logical block addresses corresponding to the scanned physical block addresses.

10. The storage apparatus of claim 9, further comprising a cache management module which stores a logical block address corresponding to a physical block address in the physical block address.

11. A mapping information recovering method for a storage apparatus using a nonvolatile memory as a cache, the method comprising:
storing in the nonvolatile memory mapping information of the nonvolatile memory and a first physical block address allocated when the mapping information is stored;
scanning the first physical block address through a second physical block address allocated currently; and
recovering the mapping information between the first physical block address and the second physical block address based on a result of the scanning.

12. The method of claim 11, wherein the nonvolatile memory comprises a mapping information storage region storing the mapping information and the first physical block address.

13. The method of claim 12, wherein the storing of the mapping information comprises storing the mapping information if a predetermined number of physical block addresses are allocated after the first physical block address.

14. The method of claim 12, wherein the mapping information comprises:
first mapping information which is mapping information of the entire nonvolatile memory; and
second mapping information which is mapping information of an updated address.

15. The method of claim 14, wherein the first mapping information comprises a logical block address field, a physical block address field, and an update field indicating whether an address is updated.

16. The method of claim 15, wherein the storing of the mapping information comprises:
storing the first mapping information in the mapping information storage region; and
additionally storing the second mapping information in the mapping information storage region based on a value of the update field.

17. The method of claim 16, wherein the storing of the mapping information comprises erasing the mapping information storage region and storing the first mapping information in the mapping information storage region if there is no storage space left in the mapping information storage region.

18. The method of claim 11, wherein the scanning of the first physical block address through the second physical block address comprises:
determining the second physical block address based on detection data which is stored in a physical block address placed after an allocated physical block address; and
scanning the first physical block address through the determined second physical block address.

19. The method of claim 18, wherein the recovering of the mapping information comprises recovering the mapping information based on the scanned physical block addresses and logical block addresses corresponding to the scanned physical block addresses.

20. The method of claim 19, further comprising storing a logical block address corresponding to a physical block address in the physical block address.

21. A computer readable recording medium storing a computer program for performing a mapping information recovering method for a storage apparatus using a nonvolatile memory as a cache, the method comprising:
storing in the nonvolatile memory mapping information of the nonvolatile memory and a first physical block address allocated when the mapping information is stored;
scanning the first physical block address through a second physical block address allocated currently; and
recovering the mapping information between the first physical block address and the second physical block address based on a result of the scanning.

* * * * *